United States Patent [19]
Berg et al.

[11] Patent Number: 5,994,459
[45] Date of Patent: *Nov. 30, 1999

[54] ELASTOMERS FROM SILICONE EMULSIONS HAVING SELF-CATALYTIC CROSSLINKERS

[75] Inventors: Daniel Trent Berg, Muskego, Wis.; Eric Jude Joffre, Midland, Mich.

[73] Assignee: Dow Corning Corporation, Midland, Mich.

[*] Notice: This patent is subject to a terminal disclaimer.

[21] Appl. No.: 08/940,751

[22] Filed: Sep. 30, 1997

Related U.S. Application Data

[63] Continuation of application No. 08/430,047, Apr. 27, 1995, Pat. No. 5,674,937.

[51] Int. Cl.$^6$ ............................................. C08K 3/20
[52] U.S. Cl. ............................. 524/837; 524/838; 524/34
[58] Field of Search ...................... 524/837, 838; 528/34

[56] References Cited

U.S. PATENT DOCUMENTS

| | | | |
|---|---|---|---|
| 2,441,320 | 5/1948 | Hyde | 260/46.5 |
| 2,676,182 | 4/1954 | Daudt et al. | 260/448.2 |
| 3,355,406 | 11/1967 | Cekada | 260/29.2 |
| 3,382,205 | 5/1968 | Beers et al. | 260/37 |
| 3,661,817 | 5/1972 | Hamilton | 260/18 S |
| 3,714,089 | 1/1973 | Hamilton et al. | 260/18 S |
| 4,147,855 | 4/1979 | Schiller et al. | 528/23 |
| 4,356,116 | 10/1982 | Beers | 524/837 |
| 4,468,760 | 8/1984 | Zalesak | 367/13 |
| 4,554,187 | 11/1985 | Grape et al. | 427/387 |
| 4,618,642 | 10/1986 | Schoenherr | 524/425 |
| 4,704,422 | 11/1987 | Bakken | 524/375 |
| 4,707,531 | 11/1987 | Shirahata . | |
| 4,788,001 | 11/1988 | Narula . | |
| 4,889,770 | 12/1989 | Ona et al. | 428/447 |
| 4,935,464 | 6/1990 | Ona et al. | 524/837 |
| 5,000,861 | 3/1991 | Yang | 252/8.6 |
| 5,034,455 | 7/1991 | Stein . | |
| 5,037,878 | 8/1991 | Cerles . | |
| 5,045,231 | 9/1991 | Braun et al. | 252/315.1 |
| 5,070,175 | 12/1991 | Tsumura et al. | 528/12 |
| 5,110,865 | 5/1992 | Ona et al. | 524/838 |
| 5,140,061 | 8/1992 | Feder | 524/783 |
| 5,145,907 | 9/1992 | Kalinowski | 524/789 |
| 5,175,057 | 12/1992 | Wengrovius et al. | 428/447 |
| 5,356,980 | 10/1994 | Feder et al. | 524/405 |
| 5,424,354 | 6/1995 | Takeoka | 524/497 |
| 5,449,712 | 9/1995 | Gierke et al. | 524/266 |
| 5,521,238 | 5/1996 | Ona et al. | 524/157 |

FOREIGN PATENT DOCUMENTS

| | | | |
|---|---|---|---|
| 0877267 | 10/1979 | Belgium . | |
| 0463431A2 | 1/1992 | European Pat. Off. | C08J 3/03 |
| 0529547 | 3/1993 | European Pat. Off. | C08G 77/06 |
| 0535687 | 4/1993 | European Pat. Off. | C08G 77/06 |
| 2802170 | 7/1979 | Germany | C09K 3/10 |
| 4124588 | 1/1993 | Germany | C01B 33/18 |
| 05098012 | 4/1993 | Japan . | |
| WO93/23455 | 11/1993 | Japan | C08G 77/06 |
| WO94/09058 | 1/1993 | WIPO . | |
| WO94/09059 | 1/1993 | WIPO . | |

*Primary Examiner*—Margaret G. Moore
*Attorney, Agent, or Firm*—Richard I. Gearhart

[57] ABSTRACT

A crosslinked polysiloxane dispersion comprising a product of a siloxane polymer or polymer mixture having a viscosity of greater than 5000 mPa.s but less than 500,000 mpa.s, and at least one self catalyzing crosslinker, a surfactant, and water.

53 Claims, No Drawings

ELASTOMERS FROM SILICONE EMULSIONS HAVING SELF-CATALYTIC CROSSLINKERS

This application is a continuation of application Ser. No. 08/430,047 filed Apr. 27, 1995 which application is now U.S. Pat. No. 5,674,937.

FIELD OF THE INVENTION

This invention relates to a crosslinked polysiloxane dispersion which upon drying yields an elastomer with improved durometer, tensile and elongation properties.

SUMMARY OF THE INVENTION

European Patent Publication 0 463 431 A2 discloses a method for producing emulsions from high viscosity polysiloxanes, bi-modal polysiloxane fluids, functional polysiloxanes and mixtures thereof. The method comprises forming a thick phase emulsion by blending a polysiloxane, at least one primary surfactant and water. To the blend, at least one secondary surfactant is added. The mixture is then mixed using shear for a sufficient period of time until an average particle size of less than 350 nanometers is achieved. The thick phase emulsion is then diluted with additional water to the desired silicone content to form the final emulsion.

PCT publication WO 94/09058 discloses a method for preparing oil-in-water emulsions of oils, gums or silicone resins by kneading a mixture of (1) a silicone phase (A) with a viscosity of at least 3 Pas or a consistency of at least 20, and (2) an aqueous phase comprising water, at least one surfactant (B) and optionally at least one water-soluble thickening polymer (C), wherein the relative amounts of water, (B) and optionally (C) are such that the aqueous phase preferably has at least as much viscosity or consistency as the silicone phase (A), said kneading being performed for a sufficient time and with sufficient shear to give an oil-in-water emulsion having a particle size of 0.1–5 μm; and optionally by diluting the medium in water.

PCT application WO 94/09059 discloses aqueous dispersions containing: a silicone oil (A) which is cross-linkable by condensation, optionally in the presence of a cross-linking agent (B), into an elastomer; optionally a cross-linking agent (B), a silane (C) and a mineral filler (D); and a catalytic amount of a hardening compound (E). Said dispersions are characterized in that they are produced by kneading a mixture of 1) a silicone phase (F) with a viscosity of at least 3 Pas, containing the oil (A) and optionally one or more of components (B), (C), (D) or (E), and 2) an aqueous phase comprising water and at least one surfactant (G), wherein the weight ratio water/water+surfactant(s) is such that the viscosity of the aqueous phase is preferably at least as high as that of the silicone phase (F); for a sufficient time and with sufficient shear to give an oil-in-water emulsion having a particle size of 0.1–5 micrometers; and optionally by diluting with water until a 25–97% dry extract is obtained; followed by adding the component(s) not present in the silicone phase (F).

U.S. Pat. No. 3,355,406 to Cekada teaches silicone rubber latices reinforced by adding a silsesquioxane having the unit formula R"SiO$_{3/2}$, wherein the R" is a member selected from the group consisting of the methyl, ethyl, vinyl, phenyl and 3,3,3-trifluoropropyl radicals, said silsesquioxane having a particle size in the range of 10 to 1000 A. More specifically the invention relates to a silicone latex comprising (1) a curable essentially linear siloxane polymer having a D.P. of at least 10 and (2) a silsesquioxane having the unit formula R"Si$_{3/2}$, wherein R" is a member selected from the group consisting of the methyl, ethyl, vinyl, phenyl and 3,3,3-trifluoropropyl radicals, said silsesquioxane having a particle size in the range of 10 to 1000 A. The silicone latex above can also contain a catalyst and/or a cross-linking agent.

U.S. Pat. No. 4,788,001 to Narula teaches oil-in-water emulsions made by a process involving the mixing of the oil and water in the presence of three nonionic surfactants having certain HLB values. The process is particularly useful for emulsifying an oil having a viscosity exceeding 50,000 centipoise (50 pascal-seconds). Any oil can be emulsified by this process, including hydrocarbon oils like mineral oil and petrolatum, and silicones, including fluids, gums and resins. A particularly useful emulsion prepared by this process is an emulsion of a bi-modal silicone which contains substantial amounts of a volatile silicone and a silicone gum.

U.S. Pat. No. 5,034,455 to Stein et al. teaches curable silicone caulk compositions using a nonionically stabilized silanol-terminated polydiorcanosiloxane, water, a silane cross-linker, a tin condensation catalyst, and calcium carbonate.

U.S. Pat. No. 5,037,878 to Cerles et al. teaches aqueous dispersions of a silicone, crosslinkable into elastomeric state upon removal of water therefrom under ambient conditions, well adapted for formulation into paints and for the production of silicone elastomer seals. The composition includes (A) 100 parts by weight of an oil-in-water emulsion containing a stabilizing amount of at least one anionic and/or nonionic surfactant and at least one alkoxylated diorganopolysiloxane, (B) an effective amount of an inorganic siliceous or nonsiliceous filler material; and (C) a catalytically effective amount of a metal curing catalyst.

U.S. Pat. No. 5,045,231 to Braun et al. teaches aqueous dispersions of organopolysiloxanes containing the following components: (A) organopolysiloxane having groups which can undergo condensation; (B) condensation catalyst; (C) organopolysiloxane resin; and (D) diorganosilanolate and/or condensation products thereof formed by splitting off water.

U.S. Pat. No. 5,145,907 to Kalinowski et al. teaches a shelf stable aqueous silicone emulsion which yields an elastomer upon removal of the water, produced by combining a reactive polydiorganosiloxane present as a cationic or nonionic emulsion of dispersed particles in water, a crosslinker, and a tin catalyst. The tin catalyst is in the form of a divalent tin atom combined with organic radicals. The emulsion can be reinforced with colloidal silica without effecting the shelf life of the reinforced emulsion.

The present invention, however, is distinguishable from the cited prior art because a self catalytic crosslinker is added to the siloxane polymer, instead of using a conventional catalyst and crosslinker. The system self cures without the need for a heavy metal catalyst, such as tin.

SUMMARY OF THE INVENTION

The present invention relates to a crosslinked polysiloxane dispersion comprising a product of a siloxane polymer or polymer mixture having a viscosity of greater than 5000 mPa.s but less than 500,000 mpa.s, and at least one self catalyzing crosslinker, a surfactant, and water. Optionally, in-situ resin reinforcers, stabilizers, filters, etc. may also be added to the mixture. The dispersion is produced by mixing above components at a sufficiently high shear to transform the mixture into a gel phase, and then diluting the gel with water to the desired silicone content. The emulsion is transformed into an elastomer upon the evaporation of water.

The present invention represents several significant advances in the art. First, the process of making the dispersion is improved because the self catalytic crosslinker is added to the siloxane polymer prior to mixing with the water and surfactant, instead of mixing in crosslinker and catalyst in a separate, later step. This self catalytic process is not known in the art. Second, the invention teaches that the physical properties of the resulting elastomeric film can be improved if an in situ resin reinforcer is added to the composition which promotes the formation of an in situ resin. Finally, the present invention teaches that the addition of certain types of silicas, in particular, $NH_4+$ treated colloidal silica can also alter the physical characteristics of the resulting elastomer and achieve excellent heat stability. In addition to the foregoing, the inventors have surprisingly found that selecting an appropriate surfactant alters the physical properties of the dispersion and the resulting elastomers, specifically properties such as freeze/thaw stability, high temperature stability, and clarity.

The present invention has additional advantages over the prior art. For example, at high solids content the composition does not require a thickener. Also, the composition cures without the use of a tin catalyst which improves shelf-stability, compatibility, and lowers the toxicity of the dispersion. Finally, the dispersions according to the present invention and the elastomers resulting therefrom have superior rheological properties, improved shelf stability, enhanced freeze/thaw characteristics, better high temperature characteristics, and high clarity.

DETAILED DESCRIPTION OF THE INVENTION

The invention comprises a polysiloxane emulsion formed from a siloxane polymer or polymer mixture having a viscosity of greater than 5000 mPa.s but less than 500,000 mPa.s, a surfactant, water and at least one self catalyzing crosslinker. Optionally, in-situ resin reinforcers, stabilizers, fillers, etc. may also be added to the mixture. The dispersion is produced by mixing these components at a sufficiently high shear to transform the mixture into a gel phase, which is then optionally diluted with water to the desired silicone content. The emulsion can be transformed into an elastomer upon the evaporation of water.

The siloxane polymers or polymer mixtures used as starting materials for the present invention are well known to those skilled in the art. These polymers are characterized as having a viscosity of greater than 5000 mPa.s but less than 500,000 mpa.s. The siloxanes are described by the following molecular formula(I):

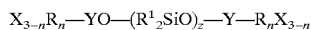

where n is 0, 1, 2 or 3 and z is an integer from 500 to 5000 and X is a hydrogen, a hydroxyl group, any condensable or any hydrolyzable group, Y is a Si atom or a Si—(CH2)m—SiR$^1_2$ group, R is individually selected from the group consisting of aliphatic, alkyl, aminoalkyl, polyaminoalkyl, epoxyalkyl, alkenyl organic, or aromatic aryl groups, and R$^1$ is individually selected from the group consisting of X, aliphatic, alkyl, alkenyl, and aromatic groups.

The siloxane polymer of the present invention can be a single siloxane represented by the aforesaid formula or mixtures of siloxanes represented by the aforesaid formula, or solvent/polymer mixtures, and the term "polymer mixture" is meant to include any of these types of polymers or mixtures of polymers. As used herein, the term "silicone content" means the total amount of silicone in the dispersed phase of the dispersion, from whatever source, including, but not limited to silicone polymer, polymer mixtures, self catalytic crosslinkers, in situ resin reinforcers, and stabilizers.

X can be a hydrogen, hydroxyl group, any condensable or hydrolyzable group. The term "hydrolyzable group" means any group attached to the silicon which is hydrolyzed by water at room temperature. The hydrolyzable group X includes hydrogen, halogen atoms such as F, Cl, Br or I; groups of the formula —OT when T is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —$(CH_2CH_2O)_2CH_3$; or any N,N-amino radical such as dimethylamino, diethylamino, ethylmethylamino, diphenylamino, or dicyclohexylamino. X can also be any amino radical such as NH2, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical such as those shown for T above and M' is any divalent hydrocarbon radical both valences of which are attached to the carbon, such as hexylene, pentylene or octylene; ureido groups of the formula —N(M)CONM"$_2$ in which M is defined above hydrocarbon radical such as those shown for T above and M" is H or any of the M radicals; carboxyl groups of the formula —OOCMM" in which M and M" are defined above or halogenated hydrocarbon radical as illustrated for T above, or carboxylic amide radicals of the formula —NMC=O(M") in which M and M" are defined above. X can also be the sulfate group or sulfate ester groups of the formula —$OSO_2$(OM) where M is defined above hydrocarbon or halogenated hydrocarbon radical illustrated for T; the cyano group; the isocyanate group; and the phosphate group or phosphate ester groups of the formula —$OPO(OM)_2$ in which M is defined above.

The most preferred groups of the invention are hydroxyl groups or alkoxy groups. Illustrative examples of the alkoxy groups are methoxy, ethoxy, propoxy, butoxy, isobutoxy, pentoxy, hexoxy, 2-ethylhexoxy, and the like; alkoxy radicals such as methoxymethoxy, ethox-ymethoxy, and the like; and alkoxyaryloxy such as ethoxyphenoxy and the like. The most preferred alkoxy groups are methoxy or ethoxy.

R is individually selected from the group consisting of aliphatic, alkyl, aminoalkyl, polyaminoalkyl, epoxyalkyl, alkenyl organic, and aromatic aryl groups. Most preferred are the methyl, ethyl, octyl, vinyl, allyl, and phenyl groups.

R$^1$ is individually selected from the group consisting of X, aliphatic, alkyl, alkenyl, and aromatic groups. Most preferred are methyl, ethyl, octyl, trifluoropropyl, vinyl, and phenyl groups.

When the siloxane polymer of formula (I) has an average of more than two condensable or hydrolyzable groups per molecule which are self catalytic, it is not necessary to have the self catalytic crosslinker present separately in order to form a crosslinked polymer. The condensable or hydrolyzable groups on different siloxane molecules can react with each other to form the required crosslinks.

The siloxane polymer of the present invention can be a mixture of different kinds of molecules, for example long chain linear molecules and short chain linear or branched molecules. These molecules may react with each other to form a crosslinked network. Such siloxanes which can take the place of more conventional crosslinkers are illustrated by low molecular weight organosilicon hydrides, such as polymethylhydrogensiloxane, low molecular weight copolymers containing methylhydrogensiloxy and dimethylsiloxy groups, $-(OSi\ (OEt)_2-$, (ethylpolysilicate), $(OSiMeC_2H_4Si(OMe)_3)_4$, and $(OSi-MeON=CR'_2)_4$, where Me is methyl and Et is ethyl.

The siloxane polymer of the present invention, thus, more advantageously also comprises mixtures of siloxane polymers of formula (I), exemplified by, but not limited to, mixtures of a,w-hydroxysiloxy terminated siloxanes and of a,w-bis(triorganosiloxy) terminated siloxanes, mixtures of a,w-hydroxylsiloxy terminated siloxanes and of a-hydroxy, w-triorganosiloxy terminated siloxanes, mixtures of a,w-dialkoxysiloxy terminated siloxanes and of a,w-triorganosiloxy terminated siloxanes, mixtures of a,w-dialkoxysiloxy terminated siloxanes and of a,w-hydroxysiloxy terminated siloxanes, mixtures of a,w-hydroxysiloxy terminated siloxanes and of a,w-triorganosiloxy terminated poly(diorgano)(hydrogenorgano)siloxane co-polymers, etc. The siloxane polymer of the invention can also comprise mixtures of siloxane polymers of formula (I) as described above with liquid, branched methylpolysiloxane polymers ("MDT fluids") comprising a combination of recurring units of the formulae:

| | |
|---|---|
| $(CH_3)_3Si_{0.5}$ | ("M") |
| $(CH_3)_2SiO$ | ("D") |
| $CH_3SiO_{1.5}$ | ("T") | and containing from 0.1 to 8% hydroxyl groups. The fluids may be prepared by co-hydrolysis of the corresponding chloro- or alkoxysilanes, as described in U.S. Pat. Nos. 3,382,205; 3,661,817; 3,714,089; 4,356,116;4,468,760; 5,175,057 and Belgian Patent No. 0,877,267, which patents are incorporated herein by reference. The proportion of MDT fluids added should not exceed 50 parts, preferably of 1 to 20 parts by weight, per 100 parts by weight of the polymer of formula (I), in order to achieve improved physical properties and adhesion of the resultant polymers. The siloxane polymer of the present invention can also comprise mixtures of siloxane polymers of formula (I) with liquid or solid, branched methylsiloxane polymeric resins comprising a combination of recurring units of the formulae:

| | |
|---|---|
| $(CH_3)_3Si_{0.5}$ | ("M") |
| $(CH_3)_2SiO$ | ("D") |
| $CH_3SiO_{1.5}$ | ("T") |
| $SiO_2$ | ("Q") | and containing from 0.1 to 8% hydroxyl groups, the fluids may be prepared by co-hydrolysis of the corresponding chloro- or alkoxysilanes, as described in U.S. Pat. Nos. 2,676,182; 2,441,320; 4,707,531; 5,070,175; EP 0,529,547; 0,535,687; DE 4,124,588; JP 05,098,012; WO 93/23455, which patents are incorporated herein by reference. The MDTQ fluid/resin may be added in a proportion not exceeding 50 parts, preferably of 1 to 10 parts by weight, per 100 parts by weight of the polymer of formula (I) to improve physical properties and adhesion of the resultant polymers. MDTQ fluids/resins can also be mixed with MDT fluids and the polymers of Formula (I). Finally the siloxane polymer can comprise mixtures of siloxane polymers of Formula (I) with compatible organic solvents, to form organic polymer/solvent mixtures. These organic solvents are exemplified by, but not limited to, organophosphate esters, such as trioleylphosphate, trioctylphosphate, or tetraethyleneglycolmonolaurylether-phosphate, as disclosed in U.S. Pat. No. 4,147,855 and German Patent No. 2,802,170 (incorporated by reference); alkanes, such as hexane, heptanes; and higher paraffines, aromatic solvents, such as toluene, benzene; etc. The polymer solvent mixtures can also be added with MDT fluids and/or MDTQ fluids to the polymer of Formula I. Any of the above mixtures of polymers or polymer/solvents can be prepared by mixing the ingredients prior to emulsification or by emulsifying them individually and then mixing the emulsions.

The surfactant of the present invention is selected from nonionic surfactants, cationic surfactants, anionic surfactants, amphoteric surfactants or mixtures thereof. The term "surfactant" is meant to describe surfactants selected from these categories or mixtures of the above. The surfactant is present in the composition in an amount of 0.5 to 10 parts by weight of siloxane polymer, and is preferably present in the amount of 2 to 10 parts by weight of siloxane polymer. Surfactant in an amount less than 3 parts by weight of siloxane polymer may also be used to achieve desirable results.

Most preferred are nonionic surfactants known in the art as being useful in emulsification of polysiloxanes. Useful nonionic surfactants may be exemplified, but not limited to, polyoxyalkylene alkyl ethers, polyoxyalkylene sorbitan esters, polyoxyalkylene esters, polyoxyalkylene alkylphenyl ethers, ethoxylated amides and others. The surfactants useful in the instant invention may be further exemplified by, but not limited to TERGITOL TMN-6, TERGITOL 15S40, TERGITOL 15S9, TERGITOL 15S12, and TERGITOL 15S15, TERGITOL 15S20, produced by UNION CARBIDE CORPORATION (Danbury, Conn.), BRIJ 30 and BRIJ 35 produced by ICI CHEMICALS (Wilmington, Del.) and TRITON X405 produced by ROHM AND HAAS (Philadelphia, Pa.) and MAKON 10 produced by Stepan Company, (Chicago, Ill.), ETHOMID O/17 produced by AKZO INC, Chicago, Ill.

Cationic and anionic surfactants known in the art as being useful in emulsification of polysiloxanes are also useful as the surfactant in the instant invention. Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethyl-amine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of di-substituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as beyaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Cationic surfactants commercially available and useful in the instant invention include, but are not limited to ARQUAD T27W, ARQUAD 16–29, ARQUAD C-33, ARQUAD T50, ETHOQUAD T/13 ACETATE, all manufactured by AKZO CHEMIE (Chicago, Ill.).

Suitable anionic surfactants include, but are not limited to, carboxylic, phosphoric and sulfonic acids and their salt derivatives. The anionic surfactants useful in the instant invention can be exemplified by, but are not limited to monovalent alkyl carboxylates; polyvalent alkyl carboxylates; acyl lactylates; alkyl ether carboxylates; n-acyl sarcosinate; n-acyl glutamates; and fatty acid-polypeptide condensates, alkali metal sulforicinates; sulfcnated glycerol esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alpha- naphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having 1 or more alkyl groups of 8 or more carbon atoms.

Anionic surfactants commercially available and useful in the instant invention include, but are not limited to POLYSTEP A4, A7, A11, A15, A15-30K, A16, A16-22, A18, A13, A17, B1, B3, B11, B12, B19, B20, B22, B23, B24, B-25, B27, B29, C-OP3S; ALPHA-STEP ML40, MC48; STEPANOL MG; all produced by STEPAN CO. Northfield Illinois. HOSTAPUR SAS produced by HOECHST CELANESE. HAMPOSYL C30 and L30 produced by W.R.GRACE & CO., LEXINGTON, Mass.

Suitable amphoteric surfactants include but are not limited to glycinates, betaines, sultaines and alkyl aminopropionates. These can be exemplified by cocoamphglycinate, cocoamphocarboxy-glycinates, cocoamidopropylbetaine, lauryl betaine, cocoamido-propylhydroxysultaine, laurylsulataine, and cocoamphodipropionate.

Amphoteric surfactants commercially available and useful in the instant invention include, but are not limited to REWOTERIC AM TEG, REWOTERIC AM DLM-35, REWOTERIC AM B14 LS, REWOTERIC AM CAS, REWOTERIC AM LP produced by SHEREX CHEMICAL CO, Dublin, Ohio.

Selection of the surfactant can have an important impact on the properties of the dispersion or the elastomer resulting after the evaporation of water. The properties particularly controllable by surfactant selection are freeze/thaw stability, high temperature heat stability and clarity.

Typical prior approaches to freeze/thaw stability include: 1) freezing point depression techniques, e.g., adding glycols or salts; 2) steric stabilization, e.g., adding additional surfactant to further stabilize the dispersion particle, or 3) bonding an anionic moiety onto the dispersion particle. These routes may add cost and negatively affect other aspects of the sealant performance like adhesion, translucency, or tack free time.

The present invention teaches a method for preparing an aqueous crosslinked silicone dispersion that withstands freeze/thaw cycling. The freeze/thaw stability is achieved though judicious selection of surfactants. In general, surfactants improve the freeze/thaw properties of the resulting elastomers if the surfactant could emulsify the polydiorganosiloxane, and if the surfactant is not selected from the group of surfactants alkyl sulfates, linear alkylbenzene sulfonates, alkyl sulfonates, and taurates. The surfactants which achieve desirable freeze/thaw results include non-ionic surfactants, such as ethoxylated alcohols and esters, polyoxypropylene compounds, amine oxides and fatty acid esters of polyhydric alcohols, cationic surfactants such as monoalkyl and dialkyl quaternary ammonium salts, amphoteric surfactants such as sulfobetaines, silicone surfactants such as silicone polyethers, florosurfactants, and certain anionic surfactants such as sulfosuccinamates, paraffin sulfonates, phosphoric esters and carboxylates. The aforereferenced surfactants or classes of surfactants can all favorably influence the number of freeze/thaw cycles.

Freeze/thaw stability is tested by subjecting the sealant in its original container to 10 freeze/thaw cycles, each cycle consisting of 16 hours at $-17+/-1°$ C.$(0+/-2°$ F.) and 8 hours at $23+/-1°$ C.$(73.4+/-2°$ F.). After each cycle a portion of the sealant is extruded and examined for appearance changes. If the extrudate is equivalent to the original unfrozen sealant by not exhibiting coagulation, gels, separation or other manifestations of instability, the sample is deemed to pass that freeze/thaw cycle.

Appropriate selection of the surfactant in the present invention can also influence the thermal stability of the elastomeric film resulting from the evaporation of water from the dispersion. Through the judicious selection of surfactant, specifically one whose degradation products at high temperature (such as greater than $100°$ C.) do not include siloxane redistribution catalysts, heat stable elastomers from aqueous siloxane dispersions can be made.

The best types of surfactants which can be used to improve the thermal stability are nonionic, cationic or anionic surfactants, which at elevated temperatures above $100°$ C. do not form siloxane redistribution catalyst. Specifically, the species which form siloxane redistribution catalysts include: 1) strong acidic species such as $H_2SO_4$, $HSO_4Na$, $H_3PO_4$, $H_2PO_4Na$ or 2) strong basic species such as NaOH, KOH, LiOH.

Nonionic, cationic, and amphoteric surfactants are preferred since the degradation products of these surfactants do not contain these species. Within the class of anionic surfactants carboxylate and sulfonate are most preferred.

Specifically, particular anionic surfactants include monovalent alkyl carboxylates; polyvalent alkyl carboxylates; acyl lactylates; alkyl ether carboxylates; n-acyl sarcosinate; n-acyl glutamates; and fatty acid—polypeptide condensates. Other anionic surfactants are ester linked sulfonates such as alkyl sulfo esters; taurates; sulfosuccinates, such as monoester, diester (both symmetrical and unsymmetrical), ethoxylated monoalkyl sulfosuccinates, alkyl amide 1/2 ester sulfosuccinate (mono/ di M+) and ethoxylated amide sulfosuccinates; sulfosuccinamates; sulfonated ethers, (Na cocoglycerol ether sulfonate); linear alkylbenzenesulfonates; benzene, toluene, xylene, cumene sulfonate; ligninsulfonates such as sulfonated polymers having molecular weights of 1000–20, 000; petroleum sulfonates, such as petroleum fractions of differing molecular weight reacted with oleum or $H_2SO_4$ to sulfonate; paraffin sulfonates, such as sulfoxidation of n-paraffins via $UV/SO_3$ secondary alkane sulfonates C14–C18 (e.g. Hoechst SAS); a-olefin sulfonates; alkyl-napthalenesulfonates; diphenyl oxide sulphonates; and linear alkylpolyethersulfonates.

Specific non-ionic surfactants include ethoxylated alcohols, ethoxylated esters, polysorbate esters, ethoxylated amides; polyoxypropylene compounds such as propoxylated alcohols, ethoxylated/propoxylated block polymers, and propoxylated esters; alkanolamides; amine oxides; fatty acid esters of polyhydric alcohols, such as ethylene glycol esters, diethylene glycol esters, propylene glycol esters, glyceryl esters, polyglyceryl fatty acid esters, sorbitan esters, sucrose esters, and glucose esters.

Specific cationic surfactants include monoalkyl quaternary ammonium salts, which are hydroxylated, or ethoxylated, propoxylated; dialkyl quaternary ammonium compounds; amidoamines; and aminimides. Specific amphoteric surfactants include N-substituted alkyl amides (i.e. fatty acid plus aminoethanolamines e.g. cocoamphoglycinate or cocoamphocarboxyglycinate); N-alkyl betaines, including alkyl amidobetaines; sulfobetaines, such as laurylsultaine, cocoarnidopropylhydroxysultaine; N-alkyl-b-aminopropionates, such as lauraminopropionic acids.

Specific silicone surfactants which improve high temperature scability include branched or linear polyoxyalkylenes. Specific flourosurfactants include those selected from anionics (such as carboxylates and sulfonics), non-ionics, and amphoterics.

The selection of the surfactant in the present invention can also influence the clarity of the elastomeric film resulting from the evaporation of water from the dispersion. In order to obtain clear elastomers from silicone latices, the refractive index must be matched in the final film between the crosslinked siloxane phase and the surfactant/residual water phase. The term "crosslinked siloxane phase" refers to the plurality of crosslinked siloxane particles remaining after water has evaporated to form an elastomeric film. The term "surfactant/residual water phase" refers to amount of residual surfactant and water remaining in the elastomeric film after the evaporation of substantially all the water from the dispersion.

In the absence of refractive index additives, this can be accomplished by using nonionic surfactants having the following structure:

where: R is hydrocarbon group having 8 to 18 carbon atoms with the —B$_y$—(EO)$_x$ attached either terminally or pendently to the hydrocarbon chain or R is a group having the formula:

x is an integer from 5 to 15; and
y is 1 or 0;
B is C(O), or C(O)N—.

In the absence of refractive index additives, this can be accomplished by using anionic surfactants with the following structure:

where: R is an aliphatic hydrocarbon group having 8 to 18 carbon atoms with the Z attached either terminally or pendently to the hydrocarbon chain, and
Z is anionic hydrophilic group containing sulfate or sulfonate attached directly to the carbon or through taurate, isethionate, or succinate linkage.

Specific anionic surfactants that will improve the clarity of the elastomeric film resulting from the composition of the present invention include sulfuric acid esters, such as alkyl sulfates, ethoxylanted alkyl sulfates, sulfated triglyceride oils, e.g., sulfated castor oil; ester linked sulfonates, such as alkyl sufo esters (acyl isethionate), taurates, and monoester sulfosuccinates; sulfosuccinamates; sulfonated ethers; paraffin sulfonates, i.e. sulfoxidation of n-paraffins via UV/SO3 secondary alkane sulfonates (e.g. Hoechst SAS); a-olefin sulfonates; and linear alkylpolyether sulfonates. Specific non-ionic surfactants that will improve clarity include polyoxyethylene compounds, such as ethoxylated alcohols, ethoxylated esters and ethoxylated amides. Rake or comb type silicone polyether surfactants will also improve the clarity of the film, as will sulfonic and nonionic fluoro surfactants.

In addition to adding the surfactant to the siloxane polymer, the mixture also includes a predetermined amount of water. The water is present in the mixture in an amount of 0.5 to 30 parts by weight of siloxane polymer, and is preferably present in the amount of 2 to 10 parts by weight of siloxane polymer. Water in an amount less than 2 parts by weight of siloxane polymer may also be used to achieve desirable results. Water may also be added after mixing, in any amount, to dilute the gel phase.

At least one self catalytic crosslinker is present in the composition in the amount of 1 to 5 parts by weight per 100 parts of siloxane polymer. The term "self catalytic crosslinker" means a molecule that has at least one leaving group as the catalytic species. While in certain circumstances only one self catalytic crosslinker may be needed to produce an elastomer having the desired physical properties, those skilled in the art will recognize that two or more self catalytic crosslinkers may be added to the reaction mixture to achieve excellent results. In addition, the self catalytic crosslinker or crosslinkers may be added with a conventional catalyst. However, adding the self catalytic crosslinker with a conventional catalyst is not required for the practice of this invention, and the compositions contemplated by this invention may in fact be free of said conventional catalysts. The self catalytic crosslinkers may be present in an amount of 1 to 5 parts of total self catalytic crosslinker per 100 parts by weight of siloxane polymer.

Typical self catalytic crosslinkers include tri or tetra functional compounds, such as R—Si—(Q)$_3$ or Si—(Q)$_4$, where Q is carboxylic , OC(O)R, e.g. acetoxy and R is an alkyl group of 1 to 8 carbon atoms inclusive, preferably methyl, ethyl or vinyl. Other preferred Q groups are the hydroxyl amines, ON(R)$_2$, where R is the same or different alkyl group of 1 to 8 carbon atoms inclusive, e.g., ON(CH$_2$CH$_3$)$_2$. Q may also be an oxime group, such as O—N=C(R)$_2$ where R is the same or different alkyl group of 1 to 8 carbon atoms inclusive, e.g., O—N=C(CH$_3$)(CH2CH$_3$) . Further, Q may be an amine group such as N(R)$_2$ where R is the same or different alkyl group of 1 to 8 carbon atoms inclusive or cyclic alkyl group, e.g., N(CH$_3$)$_2$ or NH(cyclohexyl). Finally, Q may be an acetamido group, NRC(O)R, where R is the same or different alkyl group of 1 to 8 carbon atoms inclusive, e.g. N(CH$_3$)C(O)CH$_3$.

In addition, partial hydrolysis products of the aforementioned compounds may also function as self catalytic crosslinkers. This would include dimers, trimers, tetramers etc., for example compounds of the formula:

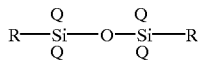

where Q and R are defined in the preceding paragraph.

Also useful as self catalytic crosslinkers are those polymeric or copolymeric species containing 3 or more (Q) sites located at either pendant or terminal positions or both on the backbone of a polydiorganosiloxane molecule.

Examples of the pendent group include compositions of the following formula:

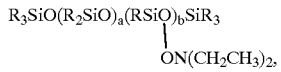

where R is the same or different alkyl group of from 1 to 8 carbon atoms inclusive, and a is 0 or a positive integer, and b is an integer greater than 2. In general polymeric compositions having either pendent or terminal Q groups may be used in the practice of the present invention, in particular, compounds of the formula:

where n is 0, 1, 2, or 3 z is a positive integer,

R is Q, or independently the same or different alkyl chain of 1 to 8 carbon atoms inclusive as long as there are at least three Q groups on the molecule. Q is as earlier defined.

Effective self catalytic crosslinkers are those compounds which form tack free elastomers when mixed with functional silicone polymers in the absence of additional catalysts such as tin carboxylates or amines. In the self catalytic crosslinkers, the acetoxy, oxime, hydroxyl amine (aminoxy), acetamide and amide groups catalyze the formation of Si—O—Si bonds in reactions of the type contemplated by this invention.

One skilled in the art would recognize that the starting polymer itself could be pre-endblocked with self catalytic crosslinking moieties. Optionally further self-catalytic crosslinkers can be added to such compositions.

In addition, in situ resin reinforcers such as methyltrimethoxy silane, vinyltrimethoxy silane, tetraethyl orthosilicate (TEOS), normal propylorthosilicate (NPOS) may be added with the self catalyzing crosslinker. It is believed that adding in situ resin reinforcers to the polydiorganosiloxane/self catalytic crosslinker mixture forms an in situ resin having a highly branched and crosslinked structure, which results in improved physical properties of the elastomer, particularly the tensile, elongation and hardness properties. It also results in improved clarity of the resulting elastomer.

Stabilizers may also be added to the composition. It is expected that any aminosilane containing polymeric or neat aminosilane will function as a stabilizer. Neat aminosilanes include compounds of the formula:

where: n and y are independently 0, 1, or 2

R is the same or different alkyl chain of 1 to 8 carbon atoms inclusive, $Q^1$ could be $(CH_2)_z$ or $\{(CH_2)_zN(R)\}_w$, where z is an integer from 1 to 10, and w is from 0 to 3 inclusive.

Polymeric amino silanes may also be used in the practice of the present invention, such as reaction products of silanol functional siloxane fluids and aminosilanes, or silanol functional siloxane fluids and alkoxysilanes and aminosilanes. For example, one useful polymeric amino siloxane particularly useful to the practice of the present invention has the formula:

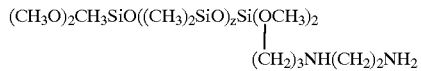

where z is from 3 to 40.

Fillers may be optionally added to the composition of the invention, such as colloidal silica, silica powders made by combustion and precipitation, semi-reinforcing agents such as diatomaceous earths, ground quartz, etc. Nonsiliceous fillers may also be added, such as calcium carbonate, hydrated alumina, magnesium hydroxide, carbon black, titanium dioxide, aluminum oxide, vermiculite, zinc oxide, mica, talcum, iron oxide, barium sulfate, slaked lime, etc. If necessary, liquid alkoxy silanes which are soluble in the siloxane polymer may be added with the filler to compatibilize the filler with the siloxane polymers.

It should be noted that selection and addition to the composition of particular fillers, such as certain types of silicas, may improve the physical properties of the resulting elastomer, particularly tensile properties, elongation properties, hardness, and heat stability. Elastomers containing ammonium stabilized silicas are heat stable while sodium stabilized silicas are not. Acidic silicas, (those containing H+ as a stabilizer) also yield heat stable elastomers. In general, colloidal or dispersed silica which is not stabilized by Group IA or IIA elements yield heat stable elastomers. Volatile organic amines and volatile inorganic bases are expected to be useful stabilizers for silicas that would yield heat stable elastomers, e.g., $(R)_{3-x}N(H)_x$ where x=0, 1, 2, or 3, R is an alkyl or aryl group such as $(CH_3)_2NH$, or R is an alcohol group such as $N(CH_2CH_2OH)_3$ or $NH(CH_2CH_2OH)_2$. The volatile organic amines include cyclohexylamine, triethylamine, dimethylaminomethylpropanol, diethylaminoethanol, aminomethyl propanol, aminobutanol, monoethanolamine, monoisopropanolamine, dimethylethanolamine, diethanolamine, aminoethylpropanediol, aminomethylpropanesiol, diisopropanolamine, morpholine, tris(hydroxymethyl)aminomethane, triisoproanolamine, triethanolamine, aniline, urea.

In addition to the volatile organic amines, volatile inorganic bases such as ammonia and ammonium carbonate also yield heat stable elastomers.

To prepare the compositions of the instant invention, siloxane polymer and the self catalyzing crosslinker are mixed. Water and surfactant are then added to the siloxane polymer and self catalyzing crosslinker and the composition is mixed until a high solids gel phase is formed. Any type of mixing equipment may be used including low shear mixing equipment, such as Turrello, Neulinger, or Ross mixers. The gel will have a silicone content of at least 85%. The gel will exhibit excellent shelf stability and may be stored for long periods of time, or transported if required. After mixing, the gel may be diluted with water to the desired silicone content. The dispersion may be stored for long periods of time, and will exhibit excellent freeze/thaw stability. The dispersion may then be dispensed, and will form an elastomeric film upon the evaporation of water.

Those skilled in the art will recognize that these crosslinked, oil in water dispersions may be prepared in other ways. For instance, the siloxane polymer and selfcatalytic crosslinker mixture may be added to a surfactant and water solution and then emulsified using colloid mills, homogenizers, sonolaters or other high shear devices as described in U.S. Pat. No. 5,037,878 and U.S. Pat. No. 5,034,455.

The dispersion may be formed by either a batch process, as described above, or a continuous process. If a continuous process is used, then a low shear dynamic mixer or static mixer is preferred.

EXAMPLES

The following examples are presented to further illustrate the compositions of this invention, but are not to be construed as limiting the invention, which is delineated in the appended claims. In the following examples, the aforesaid wet dispersions were cast into films one day after the dispersions were made, and the film was allowed to dry for a minimum of seven days prior to testing. Durometer results were obtained by the method described in ASTM C661 "Indentation Hardness of Elastomeric-Type Sealants by Means of a Durometer". Tensile and elongation results were obtained by the method described in ASTM D412 "Vulcanized Rubber and Thermoplastic Rubbers and Thermoplastic Elastomers-Tension" using dumbell specimens with an L dimension equal to 0.5 inch.

The clarity test method was developed to assign a numerical value to the translucency of crosslinked silicone elastomers prepared from silicone latex. The value reported is the thickness through which black, printed letters can be read. The sealant is extruded between two graduated shims. The shims graduate from 0.01" up to 0.20". After two weeks at ambient conditions the film is placed on white paper containing printing of rows of random letters. The measured thickness at which the letters become difficult to resolve is the clarity value. Maximum readings indicate that the letters were readable even at the thickest portion of the film.

Example 1

Using parts by weight based on siloxane polymer, 2 parts of

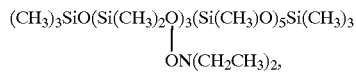

(aminoxy-functional polysiloxane, "AOPS") were mixed into 100 parts of 50,000 cs (Mw 110,000) —OH endblocked polydimethylsiloxane ("PDMS") polymer in a laboratory mixer (Whip mix, i.e. Combination Unit or Power-Mixer using the 200 mL or 500 mL Vac-U-Mixer; Whip Mix Corporation, Louisville, Ky). 4.0 parts of a 50/50 solution of water and TERGITOL TMN-6 were then mixed in until a very high solids emulsion gel was formed. This emulsion gel was diluted with 20 parts of water and 1 part of a 5% acetic acid solution.

This formulation formed a silicone elastomeric film after water evaporation with a tensile strength of 10 psi, an elongation of 310% and a Shore A durometer of 4.

Example 2

Using parts by weight based on siloxane polymer, 2 parts of AOPS were mixed into 100 parts of 50,000 cs (Mw 110,000) —OH endblocked PDMS polymer in a laboratory mixer (Whip mix). 4.0 parts of a 50/50 solution of water and TERGITOL TMN-6 were then mixed in until a very high solids emulsion gel was formed. This emulsion gel was diluted with 19 parts of water and 1 part of 5% solution of acetic acid. 1 part of

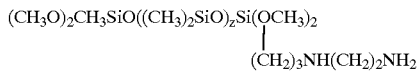

(aminoalkoxypolysiloxane, "AAPS", z having an average value of 12) was also mixed into the dispersion.

This formulation formed a silicone elastomeric film after water evaporation with a tensile strength of 21 psi, an elongation of 770% and a Shore A durometer of 5.

Example 3

Using parts based on siloxane polymer, 2 parts of AOPS, 2 parts of methyltrimethoxysilane and 1 part of a 1:1 molar solution of AAPS and acetic acid were mixed into 100 parts of 50,000 cs (Mw 110,000) —OH endblocked PDMS polymer in a laboratory mixer (Whip mix). 4.0 parts of a 50/50 solution of water and TERGITOL TMN-6 were then mixed in until a very high solids emulsion gel was formed. This emulsion gel was diluted with 21 parts of water.

This formulation formed a tack free silicone elastomeric film after water evaporation with a tensile strength of 85 psi and an elongation of 1310% and durometer of 8.

Example 4

Using parts by weight based on siloxane polymer, 2 parts of vinyltris(methylethylketoxime)silane were mixed into 100 parts of 50,000 cs (Mw 110,000) —OH endblocked PDMS polymer in a laboratory mixer (Whip mix). 6.0 parts of a 50/50 solution of water and TMN-6 was then mixed in until a very high solids emulsion gel was formed. This emulsion gel was diluted with 19.3 parts of water.

This formulation formed a tack-free silicone elastomer after water evaporation.

Example 5

Using parts by weight based on siloxane polymer, 2 parts of vinyltris(methylethylketoxime)silane were mixed into 100 parts of 50,000 cs (Mw 110,000) —OH endblocked PDMS polymer in a laboratory mixer (Whip mix). 4.0 parts of a 50/50 solution of water and TMN-6 were then mixed in until a very high solids emulsion gel was formed. This emulsion gel was diluted with deionized water to 80% silicone content.

This formulation formed a tack-free silicone elastomer after water evaporation with a tensile strength of 80 psi, an elongation of 1151 and a Shore A durometer of 7.

Example 6

Using parts by weight based on siloxane polymer, 2 parts of a ca. 50/SC mixture of methyl and ethyl triacetoxysilane were mixed into 100 parts of 50,000 cs (Mw 110,000) —OH endblocked PDMS polymer in a laboratory mixer (Whip mix). 4.0 parts of a 50/50 solution of water and TMN-6 was then mixed in until a very high solids emulsion gel was formed. This emulsion gel was diluted with deionized water to 80% silicone content.

This formulation formed a silicone elastomer after water evaporation with a tensile strength of 52 psi, an elongation of 1160 and a Shore A durometer of 4.

Example 7

Using parts by weight based on siloxane polymer, 1 parts of a ca. 50/50 mixture of methyl and ethyl triacetoxysilane were mixed into 100 parts of 50,000 cs (Mw 110,000) —OH endblocked PDMS polymer in a laboratory mixer (Hauschild, i.e. Universal Mixing Machine AM501, Hauschild & Co. KG, Hamm, Germany). 6.6 parts of a 35% solution of water and Avanel S150 (PPG Industries, Gurnee, Ill.) sulfonate surfactant was then mixed until a very high solids emulsion gel was formed. This emulsion gel was diluted with 20.4 parts deionized water.

This formulation formed a tacky silicone elastomer after water evaporation.

Example 8

Using parts by weight based on siloxane polymer, 2.04 parts of a vinyltriacetoxysilane were mixed into 100 parts of 14,000 cs —OH endblocked PDMS polymer in a laboratory mixer (Hauschild). 6.6 parts of a 35% solution of water and Avanel S150 sulfonate surfacatant were then mixed until a very high solids emulsion gel was formed. This emulsion gel was diluted with 20.8 parts deionized water.

This formulation formed a tack free silicone elastomer after water evaporation.

Example 9

Using parts by weight based on siloxane polymer, 2.0 parts of tris(dimethylamino)methylsilane were mixed into 100 parts of 50,000 cs —OH endblocked PDMS polymer in a laboratory mixer (Hauschild). 4 parts of a 45% solution of water and TMN6 nonionic surfactant was then mixed until a very high solids emulsion gel was formed. This emulsion gel was diluted with 17 parts deionized water.

This formulation formed a slightly tacky silicone elastomer after water evaporation when the dispersion had been aged for 6 weeks.

Example 10

Using parts by weight based on siloxane polymer, 100 pts of 50,000 cs (Mw 110,00) —OH endblocked polydimethylsiloxane polymer, 2.8 parts methyldivinyldi (N-methyl acetamido) silane, 1.7 parts $(CH_3)_3SiO(((CH_3)Si(ON(CH_2CH_3)_2))O)_5((CH_3)_2SiO)_3Si(CH_3)_3$, 6.26 parts Makon 10 nonionic surfactant and 10 parts water were mixed in a laboratory mixer (Whip mix) until an emulsion was formed. This emulsion had good handling properties and dried to a silicone elastomer after water evaporation.

Example 11

Using parts by weight based on siloxane polymer, 100 parts of 50,000 cs (Mw 110,000) Si—OH endblocked polymer, 2.0 parts of AOPS, 2.0 parts MTM (methyltrimethoxy silane) and 1.0 part of AAPS/acetic acid mixture (aminoalkoxypoly siloxane, mixed with glacial acetic acid at a 1 g AAPS/0.07 g AcOH ratio) were mixed together in a 10 L Turello mixer, Turello, Italy. 4.0 parts of a 50/50 by weight mixture of Tergitol TMN-6 and water (45% solid surfactant) were ther mixed in until an emulsion gel was formed. This 96% silicone content oil in water (O/W) emulsion was then diluted with 21 parts deionized water. This produced an 80% silicone content O/W crosslinked silicone latex.

This material was evaluated for freeze/thaw stability. Material that had been freshly made survived 10 cycles of freeze/thaw cycling. Elastomers made from the silicone latex initially had a Shore A durometer of 8, tensile strength of 85 psi and elongation of 1307. Elastomers made from the silicone latex after 10 F/T cycles had a Shore A durometer of 11, tensile strength of 85 psi and elongation of 1193.

Material that had not been cured but aged for 12, 24 and 48 weeks also survived 10 cycles of ASTM freeze/thaw cycling.

Example 12

Using parts by weight based on siloxane polymer, 100 parts of 50,000 cs (Mw 110,000) Si—OH endblocked polymer, 2.0 parts of AOPS (aminoxyfunctional polysiloxane), 2.0 parts MTM (methyltrimethoxy silane) and 1.0 part of AAPS/acetic acid mixture (aminoalkoxypoly siloxane mixed with glacial acetic acid at a 1g AAPS/0.07 g AcOH ratio, were mixed together in a 10 L Turello mixer. 7.4 parts of Arquad T-27, a cationic surfactant that comes as a 27% by weight aqueous solution were then mixed in until an emulsion gel was formed. This 93% silicone content oil in water (O/W) emulsion was than diluted with deionized water to an 80% silicone content O/W crosslinked silicone latex.

This material passed 10 cycles of ASTM freeze/thaw cycling without coagulating. Elastomers made from the silicone latex had a Shore A durometer of 10, tensile strength of 38 psi and elongation of 222.

Example 13

Using parts by weight based on siloxane polymer, 100 parts of 50,000 cs (Mw 110,000) Si—OH endblocked polymer, 2.0 parts of AOPS, 2.0 parts MTM and 1.0 part of AAPS/acetic acid mixture (aminoalkoxypolysiloxane mixed with glacial acetic acid at a 1 g AAPS/0.07 g AcOH ratio) were mixed together in a 10 L Turello mixer. 6.0 parts of a 50/50 by weight mixture of Tergitol TMN-10 and water (45% solid surfactant) were then mixed in until an emulsion gel was formed. This 96% silicone content oil in water (O/W) emulsion was then diluted with 13.7 parts deionized water. This produced an 84% silicone content O/W crosslinked silicone latex.

A 75% solid slurry of calcium carbonate (Omyacarb 3) was then added to this material at different levels. Table 1 summarizes the results:

TABLE 1

| slurry pts | Total Content* % | filler /PDMS ratio | F/T cycles # | D ShoreA | T psi | E % |
|---|---|---|---|---|---|---|
| 0 | 78 | 0 | 10 | 6 | 74 | 1357 |
| 53.3 | 86.3 | 0.38 | 10 | 7 | 69 | 900 |
| 106.7 | 83.5 | 0.76 | 5 | 12 | 94 | 1148 |
| 133.3 | 81.8 | 0.95 | 2 | 14 | 86 | 1024 |
| 160 | 82.6 | 1.14 | 2 | 14 | 79 | 823 |

* = (silicone + filler)/total weight

Example 14

Using parts by weight based on siloxane polymer, 100 parts of 50,000 cs (Mw 110,000) Si—OH endblocked polymer, 2.0 parts of AOPS, 2.0 parts MTM (methyltrimethoxy silane) and 1.0 part of AAPS/acetic acid mixture (aminoalkoxypoly siloxane mixed with glacial acetic acid at a 1g AAPS/0.07 g AcOH ratio) were mixed together in a 10 L Turello mixer. 4.0 parts of a 50/50 by weight mixture of Tergitol TMN-6 and water (45% solid surfactant) were then mixed in until an emulsion gel was formed. This 96% silicone content oil-in-water (O/W) emulsion was than diluted with 21 parts deionized water. This produced an 80% silicone content O/W crosslinked silicone latex.

To this material various fillers were added. Table 2 below shows the number of Freeze/Thaw cycles, hardness, tensile strength and elongation values of the elastomer after various fillers were added.

TABLE 2

| Filler | Total Content* % | filler/PDMS ratio | F/T cycle # | D Sh-A | T psi | E % |
|---|---|---|---|---|---|---|
| ATH S-3[a] | 74 | 0.40 | 10 | 22 | 91 | 1080 |
| ATH S-23[b] | 77 | 0.65 | 10 | 24 | 96 | 1173 |
| Al-Tab[c] | 80 | 1.0 | 10 | 24 | 88 | 780 |
| Omya-5[d] | 80 | 1.0 | 10 | 25 | 87 | 1107 |
| Omya-21[e] | 80 | 1.0 | 10 | 27 | 73 | 867 |
| 10ES Wollas[f] | 77 | 0.65 | 10 | 28 | 128 | 767 |
| SparW-44[g] | 80 | 1.0 | 10 | 23 | 82 | 867 |
| DicalWB5[h] | 70 | 0.15 | 10 | 22 | 134 | 1027 |
| Siltex44[i] | 77 | 0.60 | 10 | 26 | 119 | 480 |
| 325Nova[j] | 79 | 0.80 | 10 | 26 | 118 | 760 |
| 200Nova[k] | 80 | 1.0 | 10 | 28 | 104 | 440 |

* = (silicone + filler)/total weight
[a]= alumina trihydrate: Spacerite S-3, 1 micron[1]
[b]= alumina trihydrate: Spacerite S-23, 7 micron[1]
[c]= calcined alumina: Tabular, 30–40 micron[1]
[d]= calcium carbonate: Omyacarb-5, 5 micron[2]
[e]= calcium carbonate: Omyacarb-21, 21 micron[2]
[f]= silane treated wollastonite: 10ES Wollastokup, 3.5 micron[3]
[g]= Barite (BaSO4): Sparwite W-44, 12 micron[4]
[h]= diatomite: Dicalite WB-5, 6–8 micron[5]
[i]= amorphous fused silica: Siltex 44, 8.8 micron[6]
[j]= noviculite silica: 325 Novacite, 7–15 microns[7]
[k]= noviculite silica: 200 Novacite, 11–19 micron[7]
[1]= Aluminum Company of America, Pittsburgh, PA
[2]= Omya, Inc Proctor, Vermont
[3]= NYCO; Willsboro, NY
[4]= Mountain Minerals; Alberta, Canada
[5]= Grefco Inc; Torrance, CA
[6]= Kaopolite Inc; Union NJ
[7]= Malvern Minerals; Hot Springs, Arkansas Example 15

Two silicone latices were prepared.
Base #1

Using parts by weight based on siloxane polymer, 100 parts of 50,000 cs (Mw 110,000) Si—OH endblocked polymer, 2.0 parts of AOPS, 2.0 parts MTM (methyltrimethoxy silane) and 1.0 part of AAPS/acetic acid mixture (aminoalkoxypoly siloxane mixed with glacial acetic acid at a 1g AAPS/0.07 g AcOH ratio) were mixed together in a 10 L Turello mixer. 4.0 parts of a 50/50 by weight mixture of Tergitol TMN-6 and water (45% solid surfactant) were then mixed in until an emulsion gel was formed. This 96% silicone content oil in water (O/W) emulsion was then diluted with 21 parts deionized water. This produced an 80% silicone content O/W crosslinked silicone latex.
Base #2

Using parts by weight based on siloxane polymer, 100 parts of 50,000 cs (Mw 110,000) Si—OH endblocked polymer, 2.0 parts of AOPS (aminoxyfunctional polysiloxane), were mixed together in a 10 L Turello mixer. 4.0 parts of a 50/50 by weight mixture of Tergitol TMN-6 and water (45% solid surfactant) were then mixed in until an emulsion gel was formed. This 96% silicone content oil in water (O/W) emulsion was than diluted with 21 parts deionized water. This produced an 80% silicone content O/W crosslinked silicone latex.

SAMPLE PREPARATION:

The following samples were prepared by mixing the above prepared materials with different fillers and diluting to the desired silicone content. For the silica samples two silica/PDMS ratios, 4.9 and 9.8, were made. These gave latices with a total silicone content (silica+silicone)/total weight of 52% and 54%.

For example 123 g of Base #1 would be mixed with 33.1 g of NALCO 2326 colloidal silica and 43.8 g of deionized water. This would give a silica/PDMS ratio of 4.9% and a total silicone content of 52%.

The controls were Base #1 and Base #2 without any fillers. The fillers used were selected from groups of colloidal silicas, dispersed fumed silicas, and non-siliceous fillers as follows:

Colloidal Silicas:

| Trade name | % solids | surface area (m$^2$/g) | stabilizing ion |
|---|---|---|---|
| Colloidal silicas: | | | |
| Nalco 2326 | 15 | 600 | NH4+ |
| Nalco TX8806 | 30 | 375 | NH4+ |
| Nalco 1115 | 15 | 750 | Na+ |
| Nalco 1034A | 34 | 150 | — |
| Dispersed Fumed Silicas: | | | |
| Cabosperse S3810 | 14 | 380 | Na+ |
| Cabosperse S2095 | 17 | 200 | Na+ |
| Cabosperse A2095 | 17 | 200 | NH4+ |
| Non-siliceous Fillers: | | | |
| Omyacarb-3 | 2.5 | — | (calcium carbonate) |
| Hydral 710 | 6–12 | — | (alumina trihydrate) |

These latices were allowed to dry for two weeks. Samples from the resulting elastomeric films were placed into weighing pans and then placed into 150° C. and 200° C. ovens. Weight loss was tracked over time. Samples of a (non-latex) RTV silicone were also tracked. The weight loss data is described in Table 3.

TABLE 3

| Sample | % Filler /PDMS (pts) | Base #1 | | | | Base #2 | | | |
|---|---|---|---|---|---|---|---|---|---|
| | | 150C | | 200C | | 150C | | 200C | |
| | | 3 wk | 12 wk | 3 wk | 12 wk | 3 wk | 12 wk | 3 wk | 12 wk |
| Filler | | 2.6 | 6.5 | 6.1 | 13.9 | | | | |
| None | | 3.9 | 5.3 | 6.9 | 10.6 | 5.0 | ?? | 37.2 | 47.3 |
| Colloidal silicas | | | | | | | | | |
| Nalco 2326 | 4.9 | 3.6 | 6.9 | 4.5 | 6.6 | 4.3 | 4.5 | 4.9 | 7.3 |

TABLE 3-continued

| Sample | % Filler /PDMS (pts) | Base #1 150C 3 wk | Base #1 150C 12 wk | Base #1 200C 3 wk | Base #1 200C 12 wk | Base #2 150C 3 wk | Base #2 150C 12 wk | Base #2 200C 3 wk | Base #2 200C 12 wk |
|---|---|---|---|---|---|---|---|---|---|
|  | 9.8 | — | — | — | — | 2.8 | 3.8 | 4.2 | 8.7 |
| Nalco TX8806 | 4.9 | 3.6 | 4.6 | 4.7 | 6.3 | 3.1 | 3.6 | 3.9 | 5.6 |
|  | 9.8 | 3.3 | 4.3 | 5.0 | 5.9 | 2.8 | 3.7 | 4.7 | 6.7 |
| Nalco 1034 | 4.9 | 3.9 | 5.8 | 4.7 | 5.4* | — |  | — |  |
| Nalco 1115 | 4.9 | 5.9 | 13.8 | 24.6 | 69 | 4.8 | 10.7 | 12.9 | 79.0 |
|  | 9.8 | 5.3 | 15.3 | 10.9 | 68 | 4.0 | 10.3 | 9.2 | 80.0 |
| Dispersed Fumed Silicas |  |  |  |  |  |  |  |  |  |
| C[1] S3810 | 4.9 | 3.7 | 4.6 | 8.4 | 58.0 | 3.5 | 4.4 | ?? | 43.5 |
|  | 9.8 | 4.1 | 2.3 | 8.2 | 36.4 | 3.8 | 4.9 | 10.3 | 41.2 |
| C A2095 | 4.9 | — | — | — | — | 2.5 | 3.8 | 4.6 | 4.8* |
|  | 9.8 | — | — | — | — | 3.2 | 3.8 | 4.3 | 3.9* |
| C S2095 | 4.9 | — | — | — | — | 3.4 | 4.2 | 9.8 | 20.4* |
|  | 9.8 | — | — | — | — | 3.9 | 5.7 | 8.6 | 40.9 |
| 1 Cabosperse Calcium Carbonates |  |  |  |  |  |  |  |  |  |
| Omya-3 | 12 | 4.3 | 5.9 | 19.7 | 32.2 | 4.4 | 9.8 | 36.6 | 41.8 |
|  | 80 | 4.0 | 14.0 | 38.0 | 40.5 | 6.2 | 27.3 | 54.0 | 99.5 |

* = 12 week sample lost, this the 6 week sample

This example clearly shows that the Base #1 control and Base #1 or #2 with ammonia stablized silicas are as stable or more stable than the room temperature vulcanizable silicone elastomers.

Additional data on the physical properties of these elastomers is shown below in Table 4. (Shore A durometer, Tensile strength-psi, Elongation-%)

| (RTV comparison) | 22 | 1116 | 1440 |
|---|---|---|---|

TABLE 4

| SELF-CATALYTIC CROSSLINKER = Base #1 formulation | | | | |
|---|---|---|---|---|
| control (no filler) |  | 17 | 111 | 1260 |
| CaCO3 | 12 pts | 22 | 104 | 1140 |
|  | 80 pts | 26 | 90 | 1253 |
| Nalco 1034 | 4.9 | 21 | 84 | 800 |
| Nalco 1115 | 4.9 | 33 | 290 | 1420 |
|  | 9.8 | 44 | 547 | 1573 |
| SELF-CATALYTIC CROSSLINKER = Base #2 formulation | | | | |
| control (no filler) |  | 3 | 20 | 580 |
| Cabosperse A2095 | 4.9 | 7 | 30 | 587 |
|  | 9.8 | 20 | 183 | 1747 |
| Cabosperse S2095 | 4.9 | 8 | 40 | 687 |
|  | 9.8 | 16 | 152 | 1307 |
| Cabosperse S3810 | 4.9 | 11 | 57 | 987 |
|  | 9.8 | 21 | 192 | 1293 |
| Nalco 2326 | 4.9 | 25 | 143 | 1153 |
|  | 9.8 | 48 | 306 | 993 |
| Nalco TX8806 | 4.9 | 13 | 63 | 946 |
|  | 9.8 | 32 | 252 | 1367 |
| Nalco 1115 | 4.9 | 18 | 144 | 1320 |
|  | 9.8 | 30 | 223 | 1120 |
| CaCo3 | 12 | 5 | 20 | 560 |
|  | 80 | 5 | 16 | 320 |

Example 16

A laboratory dynamic mixer of the rotor-stator type had a length of ca. 10" with an internal diameter of ca. 1.5". To the exit port was attached a static mixer containing an inlet port for dilution water. To the polymer feed line prior to the entrance to the mixing zone was also attached a static mixer containing an inlet port for the self catalytic crosslinker. In this case, a dimethyl-methyldiethylhydroxylamine siloxane copolymer was used.

The dynamic mixer itself had inlet ports for a water/surfactant mixture and for a polymer feed. The self-catalytic crosslinker was fed into the polymer stream prior to the static mixer. This mixture was then fed into the mixing zone, while the surfactant/water was fed into another inlet into the mixing zone. With the rotor turned on, and the dilution water turned off, a clear gel having 96% silicone content oil in water emulsion was prepared. The dilution water was turned on to prepare a 91% silicone content latex which had a white, paste-like appearance. This material formed a very slightly tacky silicone elastomer after water evaporation.

The following conditions were used:
50,000 cst Si—OH terminated PDMS feed: 115 g/min
self-catalytic crosslinker feed: 2.6 g/min
45% aqueous Tergitol TMN-6 surfactant feed: 4.4 g/min
Deionized water for dilution feed: 7.2 g/min
rotor RPM: 900

Example 17

Using parts by weight based on siloxane polymer, 100 parts of a polymer mixture consisting of 85% Si—OH terminated PDMS, 12% monosilanol terminated PDMS, and 3% Si—Me3 terminated PDMS, 2.0 parts of AOPS, 2.0 parts MTM (methyltrimethoxysilane), 1.0 part of AAPS (aminoalkoxypolysiloxane), and 0.076 part of glacial acetic acid were mixed together in a 10 L Turello mixer. 6.0 parts of a 50/50 by weight mixture of Tergitol TMN-10 and water (45% solid surfactant) were then mixed in until an emulsion gel was formed. This 96% silicone content oil in water (O/W) emulsion was than diluted with 21 parts deionized water. This produced an 80% silicone content O/W crosslinked silicone latex.

For a 100 g sample, 45.3 g of the above material was mixed with 36.6 g of Alcoa Hydral 710 alumina trihydrate (Alcoa Industrial Chemicals Div. Bauxite, Ark.), 2.16 g of Joncryl 61LV dispersant (Johnson Wax Speciality Chemicals, Racine, Wis.), 0.25 g of aminomethylpropanol (AMP-95) (Angus Chemical Co., Buffalo Grove, Ill.) and 15.7 g of water. This yielded a filled silicone latex with a total silicone content of 74.2 and a ATH/silicone ratio of 0.97. This resulting elastomer from this material was aged at 150° C. and 200° C. After 6 weeks at 150° C. this material had only lost 3.3% of its weight, while at 200° C. it had only lost 10.6% of its weight. This compares to the non-latex DC 3145 RTV silicone which lost 3.7% after 6 weeks at 150° C. and 7.9% after 6 weeks at 200° C.

Example 18

Using parts by weight based on siloxane polymer, 2 parts of AOPS were mixed into 100 parts of 50,000 as (Mw 110,000) —OH endblocked PDMS polymer in a laboratory mixer (Whip mix). 4.0 parts of a 50/50 solution of water and TMN-6 was then mixed in until a very high solids emulsion gel was formed. This emulsion gel was diluted to an 80% silicone content emulsion.

This formulation formed a silicone elastomer after water evaporation. The clarity value equaled 86 mils.

Example 19

Using parts based on siloxane polymer, 2 parts of AOPS, 2 parts of methytrimethoxysilane and 1 part of a 1:1 molar solution of AAPS and acetic acid were mixed into 100 parts of 50,000 cs (Mw 110,000) —OH endblocked PDMS polymer in a laboratory mixer (Whip mix). 4.0 parts of a 50/50 solution of water and TMN-6 was then mixed in until a very high solids emulsion gel was formed. This emulsion gel was diluted to an 80% silicone content emulsion.

This formulation formed a silicone elastomer after water evaporation with a tensile strength of 102 psi and an elongation of 1664. The clarity value equaled 176 (maximum reading).

Example 20

Using parts based on siloxane polymer, in separate experiments 0.5, 1.0, 2.0 and 3.0 parts of AOPS, were mixed into 100 parts of 60,000 cs trimethoxysilylethylene endblocked PDMS polymer in a laboratory mixer (Whip mix). 4.0 parts of a 45% solution of water and TMN-6 was then mixed in until a very high solids emulsion gel was formed. This emulsion gel was diluted to an 80% silicone content emulsion.

These formulations all formed a silicone elastomer after water evaporation. The 0.5 part and 1.0 part AOPS samples formed tacky elastomers even after 11 weeks gestation of the wet dispersion. The 2.0 part AOPS sample formed a tack-free elastomer after 5 weeks gestation of the wet dispersion. The 3.0 part AOPS sample formed a tack-free elastomer after 3.5 weeks gestation of the wet dispersion.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

That which is claimed is:

1. A crosslinked polysiloxane dispersion comprising a product of (A) a siloxane polymer or polymer mixture having a viscosity of greater than 5000 mPa.s but less than 500,000 mPa.s, and (B) at least one self catalyzing crosslinker, a surfactant, and water, wherein the self catalyzing crosslinker has the formula:

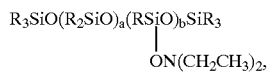

where R is the same or different alkyl group of from 1 to 8 carbon atoms inclusive, and a is 0 or a positive integer, and b is an integer greater than 2.

2. The dispersion of claim 1, wherein the polysiloxane dispersion has a silicone content, and said silicone content is from 1% to 98% by weight of the polysiloxane dispersion.

3. The dispersion of claim 1, wherein the polysiloxane dispersion has a silicone content, and said silicone content is from 40% to 90% by weight of the polysiloxane dispersion.

4. The dispersion of claim 1, wherein 1 to 10 parts by weight of surfactant is present per 100 parts of siloxane polymer or polymer mixture.

5. The dispersion of claim 1, wherein 1 to 5 parts by weight of surfactant is present per 100 parts of siloxane polymer or polymer mixture.

6. The dispersion of claim 1, wherein 10 to 60 parts by weight of water is present per 100 parts of siloxane polymer or polymer mixture.

7. The dispersion of claim 1, wherein 0.1 to 5 parts by weight of self catalyzing crosslinker is present per 100 parts of siloxane polymer or polymer mixture.

8. The dispersion of claim 1, wherein the dispersion includes a stabilizer of the formula:

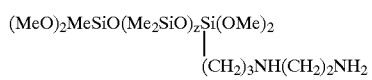

where Me is a methyl group, and z is an integer from 3 to 40 inclusive.

9. The dispersion of claim 1, wherein the dispersion includes an in situ resin reinforcer selected from the group consisting of methyltrimethoxy silane, vinyltrimethoxy silane, tetraethyl orthosilicate, and normal propylorthosilicate.

10. The dispersion of claim 1, wherein the surfactant is not an alkyl sulfate, alkyl sulfonate, or taurate.

11. The dispersion of claim 1, wherein the surfactant has at least one degradation product at a temperature greater that 100° C., and said degradation product or degradation products do not include siloxane redistribution catalysts.

12. The dispersion of claim 1, wherein the dispersion includes a filler.

13. The dispersion of claim 12, wherein the filler is an ammonium stabilized silica.

14. The dispersion of claim 1, wherein the dispersion has a crosslinked siloxane phase with a refractive index, and the dispersion also has a surfactant/residual water phase with a refractive index, and the refractive index of the crosslinked siloxane phase matches the refractive index of the surfactant/residual water phase.

15. The dispersion of claim 1, wherein the surfactant has the formula:

where: R is hydrocarbon group having 8 to 18 carbon atoms with the —$B_y$—$(CH_2CH_2O)_x$H attached either terminally or pendently to the hydrocarbon chain or R is a group having the formula:

x is an integer from 5 to 15; and
y is 1 or 0;
B is C(O), or C(O)N—.

16. The dispersion of claim 1, wherein the surfactant has the formula:

R—Z where: R is hydrocarbon group having 8 to 18 carbon atoms with the Z attached either terminally or pendently to the hydrocarbon chain, and
Z is anionic hydrophilic group containing sulfate or sulfonate attached directly to the carbon or through taurate, isethionate, or succinate linkage.

17. A method for making a crosslinked polysiloxane dispersion comprising the steps of:
combining components comprising a siloxane polymer or polymer mixture having a viscosity of greater than 5000 mPa.s but less than 500,000 mPa.s, a surfactant, water, and at least one self catalyzing crosslinker, wherein said self catalyzing crosslinker has a leaving group selected from the group consisting of acetoxy, aminoxy and oxime,
mixing said components at a sufficiently high shear to transform the components into a gel phase, and
optionally, diluting the gel phase with water.

18. The method of claim 17, wherein the polysiloxane dispersion has a silicone content, and said silicone content is from 1% to 98% by weight of the composition.

19. The method of claim 17, wherein the polysiloxane dispersion has a silicone content, and said silicone content is from 40% to 90% by weight of the composition.

20. The method of claim 17, wherein 1 to 10 parts by weight of surfactant is present in the emulsion per 100 parts of siloxane polymer or polymer mixture.

21. The method of claim 17, wherein 2 to 5 parts by weight of surfactant is present in the emulsion per 100 parts of siloxane polymer or polymer mixture.

22. The method of claim 17, wherein 3 to 30 parts by weight of water is present in the emulsion per 100 parts of siloxane polymer or polymer mixture.

23. The method of claim 17, wherein 6 to 15 parts by weight of water is present per 100 parts of siloxane polymer or polymer mixture.

24. The method of claim 17, wherein 1 to 5 parts by weight of self catalyzing crosslinker is present in the emulsion per 100 parts of siloxane polymer or polymer mixture.

25. The method of claim 17, wherein the self catalyzing crosslinker has at least one aminoxy catalytic leaving group.

26. The method of claim 17, wherein the self catalyzing crosslinker is

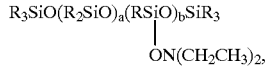

where R is the same or different alkyl group having from 1 to 8 carbon atoms inclusive, and a is 0 or a positive integer, and b is an integer greater than 3.

27. The method of claim 17, comprising the additional step of adding before or after mixing, a stabilizer of the formula:

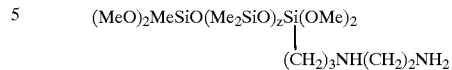

where Me is a methyl group, and z is an integer from 3 to 40 inclusive.

28. The method of claim 17, comprising the additional step of adding prior to mixing an in situ resin reinforcer selected from the group consisting of methyltrimethoxy silane, vinyltrimethoxy silane, tetraethyl orthosilicate, and normal propylorthosilicate.

29. The method of claim 17, wherein the surfactant is not an alkyl sulfate, alkyl sufonate, or taurate.

30. The method of claim 17, wherein the surfactant has at least one degradation product at a temperature greater that 100° C., and said degradation product or degradation products do not include siloxane redistribution catalysts.

31. The method of claim 17, comprising the additional step of adding a filler either before or after mixing.

32. The method of claim 31, wherein the filler is an ammonium stabilized silica.

33. The method of claim 17, wherein the dispersion has a crosslinked siloxane phase with a refractive index, and the dispersion also has a surfactant/residual water phase with a refractive index, and the refractive index of the crosslinked siloxane phase matches the refractive index of the surfactant/residual water phase.

34. The method of claim 19, wherein the surfactant has the formula:

R—B$_y$—(CH$_2$CH$_2$O)$_x$H where: R is hydrocarbon group having 8 to 18 carbon atoms with the —B$_y$—(CH$_2$CH$_2$O)$_x$H attached either terminally or pendently to the hydrocarbon chain or R is a group having the formula:

x is an integer from 5 to 15; and
y is 1 or 0;
B is C(O), or C(O)N—.

35. The method of claim 17, wherein the surfactant has the formula:

R—Z where: R is hydrocarbon group having 8 to 18 carbon atoms with the Z attached either terminally or pendently to the hydrocarbon chain, and Z is anionic hydrophilic group containing sulfate or sulfonate attached directly to the carbon or through taurate, isethionate, or succinate linkage.

36. The method of claim 17, wherein the dispersion is prepared in a batch process.

37. The method of claim 17, wherein the dispersion is prepared in a continuous process.

38. A crosslinked polysiloxane dispersion comprising:
a product of (A) a siloxane polymer or polymer mixture having a viscosity of greater than 5000 mPa.s but less than 500,000 mPa.s, and (B) at least one self catalyzing crosslinker having a leaving group selected from the group consisting of acetoxy and oxime; a surfactant; and water; wherein said composition is free of a catalyst.

39. The dispersion of claim 38, wherein the polysiloxane dispersion has a silicone content and said silicone content if from 1% to 98%.

40. The dispersion of claim 38, wherein the polysiloxane dispersion has a silicone content of from 40% to 90%.

41. The dispersion of claim 38, wherein 1 to 10 parts by weight of surfactant is present for 100 parts of siloxane polymer or polymer mixture.

42. The dispersion of claim 38, wherein 1 to 5 parts by weight of surfactant is present for 100 parts of siloxane polymer or polymer mixture.

43. The dispersion of claim 38, wherein 10 to 60 parts by weight of water is present for 100 parts of siloxane polymer or polymer mixture.

44. The dispersion of claim 38, wherein 1 to 5 parts by weight of self catalyzing crosslinker is present for 100 parts of siloxane polymer or polymer mixture.

45. The dispersion of claim 38, wherein the dispersion includes a stabilizer of the formula:

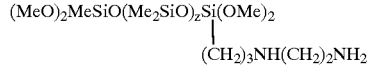

where Me is a methyl group, and z is an integer from 3 to 40 inclusive.

46. The dispersion of claim 38, wherein the dispersion includes an in situ resin reinforcer selected from the group consisting of methyltrimethoxy silane, vinyltrimethoxy silane, tetraethyl orthosilicate, and normal propylorthosilicate.

47. The dispersion of claim 38, wherein the surfactant is not an alkyl sulfate, alkyl sulfonate, or taurate.

48. The dispersion of claim 38, wherein the surfactants degradation products at a temperature greater that 100° C. do not include siloxane redistribution catalysts.

49. The dispersion of claim 38, wherein the dispersion includes a filler.

50. The dispersion of claim 49, wherein the filler is an ammonium stabilized silica.

51. The dispersion of claim 38, wherein the water is removed to form the dispersion has a crosslinked siloxane phase with a refractive index, and a surfactant/residual water phase with a refractive index, and the refractive index of the crosslinked siloxane phase matches the refractive index of the surfactant/residual water phase.

52. The dispersion of claim 38, wherein the surfactant has the formula:

where: R is hydrocarbon group having 8 to 18 carbon atoms with the $-B_y-(CH_2CH_2O)_xH$ attached either terminally or pendently to the hydrocarbon chain or R is a group having the formula:

x is an integer from 5 to 15; and
y is 1 or 0;
B is C(O), or C(O)N—.

53. The dispersion of claim 38, wherein the surfactant has the formula:

where: R is hydrocarbon group having 8 to 18 carbon atoms with the Z attached either terminally or pendently to the hydrocarbon chain, and Z is anionic hydrophilic group containing sulfate or sulfonate attached directly to the carbon or through taurate, isethionate, or succinate linkage.

* * * * *